March 18, 1969  W. C. GILBERT  3,433,307
AUTOMATIC CUTTING DEPTH REGULATOR FOR SHANK-TYPE
CULTIVATORS AND THE LIKE Filed Dec. 10, 1965  Sheet 1 of 4

INVENTOR.
WAYNE C. GILBERT,
BY
Berman, Davidson & Berman
ATTORNEYS.

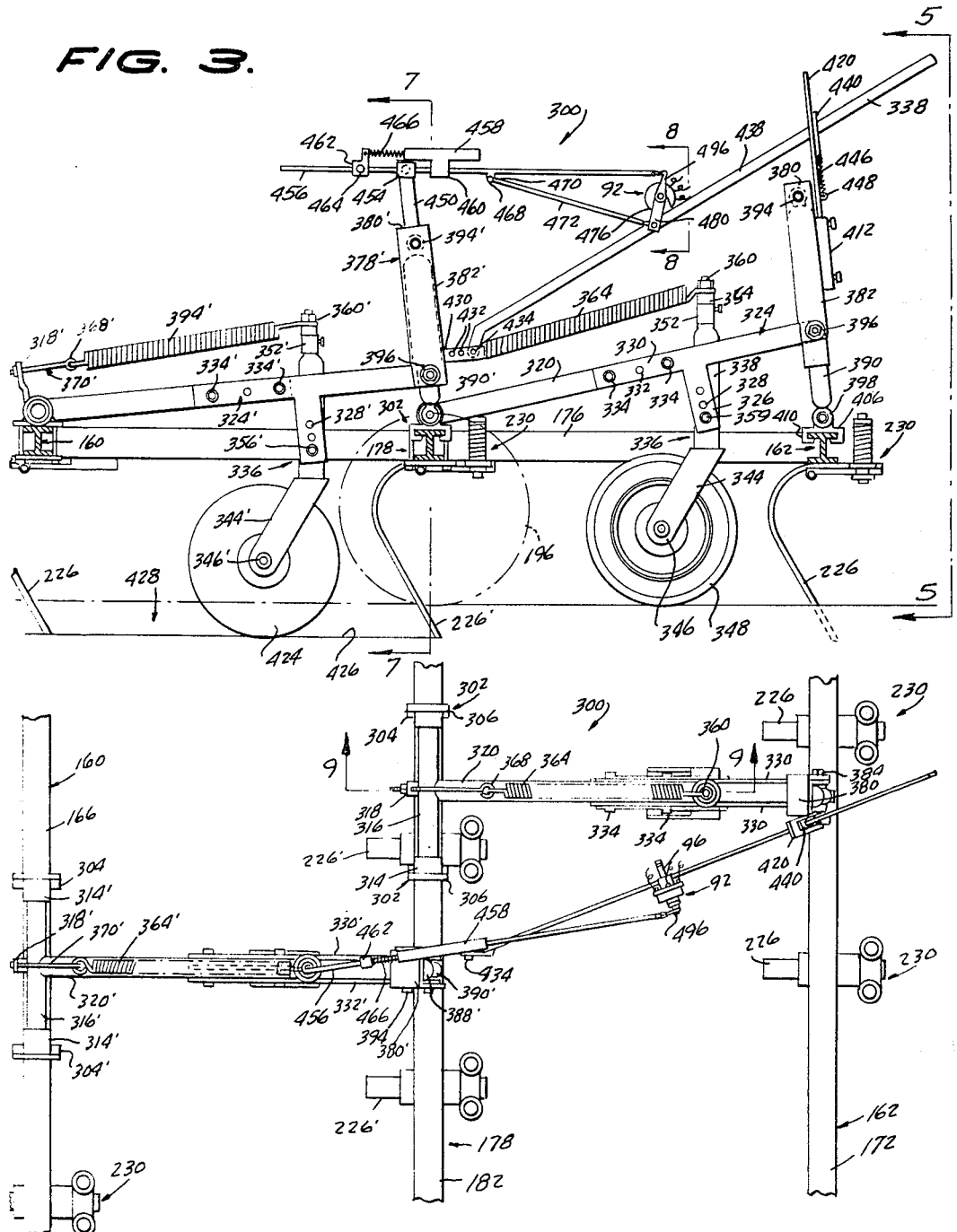

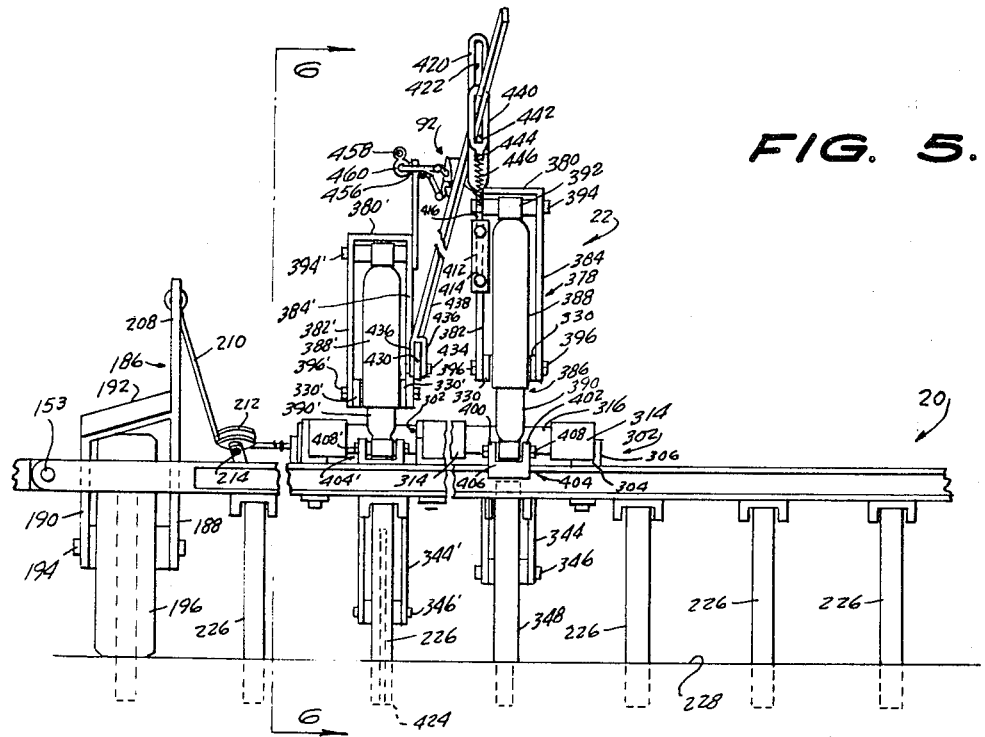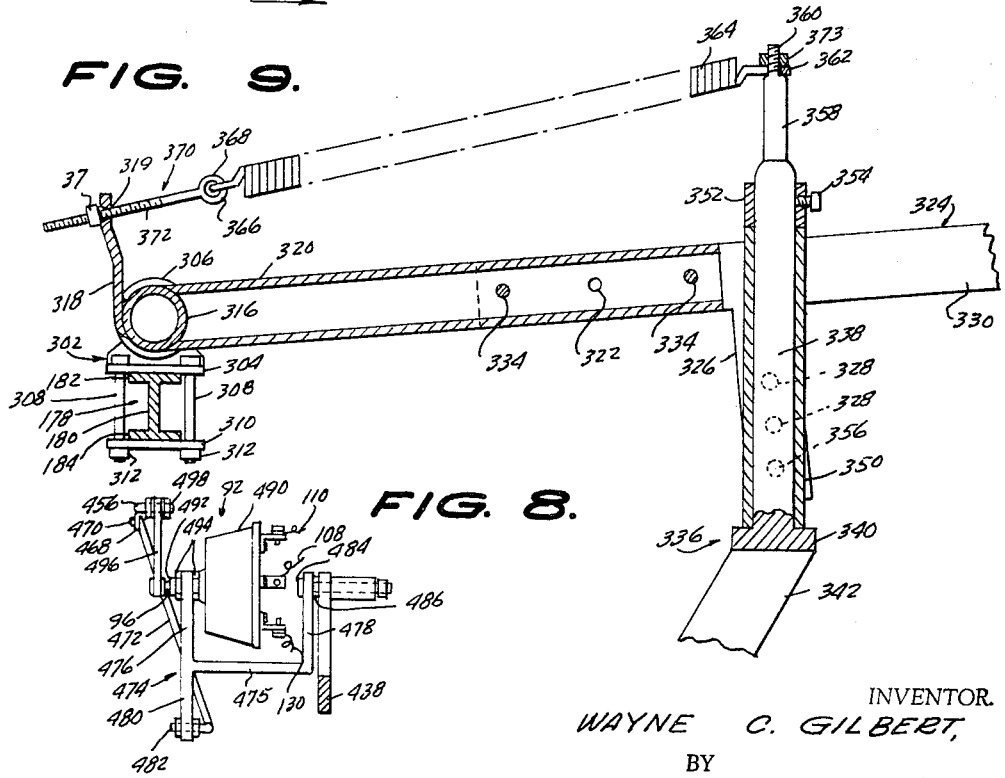

March 18, 1969
W. C. GILBERT
3,433,307
AUTOMATIC CUTTING DEPTH REGULATOR FOR SHANK-TYPE
CULTIVATORS AND THE LIKE
Filed Dec. 10, 1965
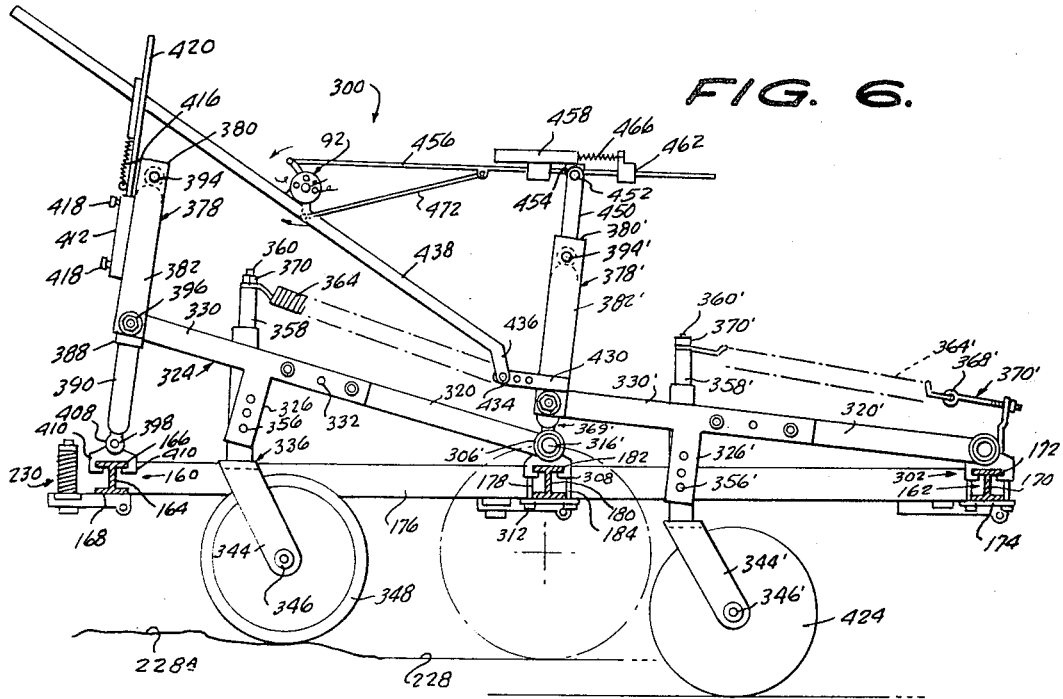
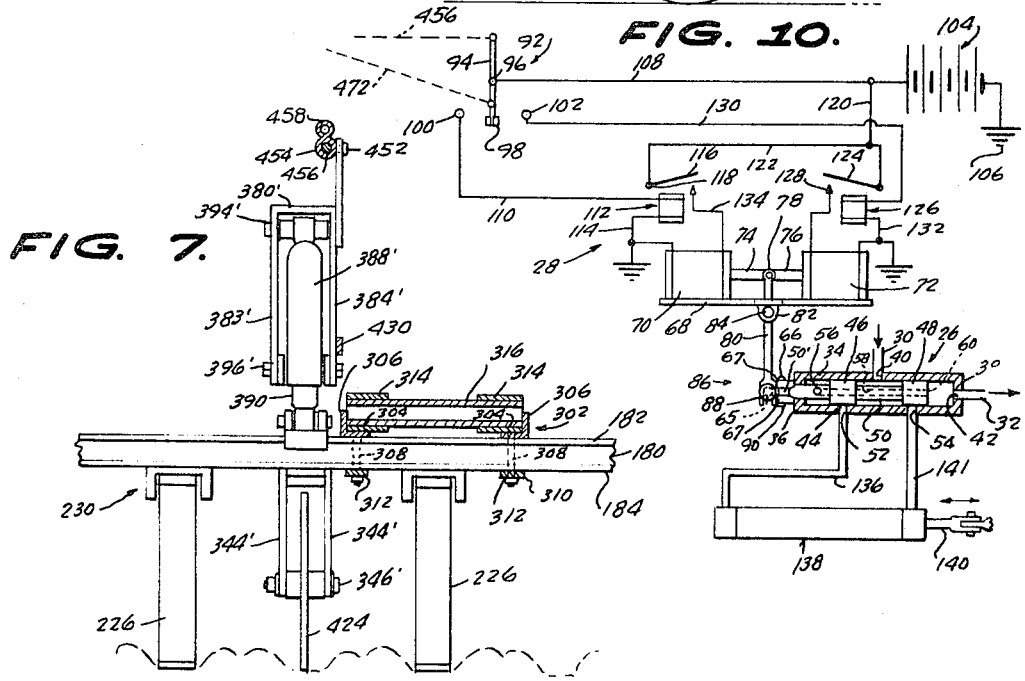
INVENTOR.
WAYNE C. GILBERT,
BY
*Berman, Davidson + Berman*
ATTORNEYS.

United States Patent Office 3,433,307
Patented Mar. 18, 1969

3,433,307
AUTOMATIC CUTTING DEPTH REGULATOR FOR SHANK-TYPE CULTIVATORS AND THE LIKE
Wayne C. Gilbert, 807 1st St. W.,
Roundup, Mont. 59072
Filed Dec. 10, 1965, Ser. No. 512,931
U.S. Cl. 172—4    6 Claims
Int. Cl. A01b 63/111, 63/10, 19/04

ABSTRACT OF THE DISCLOSURE

A mobile farm implement having frame supporting ground engaging tools, at least one frame supporting wheel vertically adjustable relative to said frame to control the depth of penetration of said tools, an automatically operated control means monitoring said vertical adjustment means to maintain a constant depth of ground penetration of said tools, said automatic means including tracking means suspended on a substantially vertical swivel axis from said frame and swingable about a horizontal pivot to track the bottom of a furrow cut by a ground engaging tool, sensing means suspended on a substantially vertical swivel axis from said frame and swingable about a horizontal pivot for sensing the surface of the ground, and means connected with the tracking and sensing means operable in response to a change in the vertical distance between the tracking and sensing means to move said vertical adjustment means for the wheel to maintain a constant vertical adjustment of the tool from the ground surface.

---

This invention relates to the general field of husbandry and, more specifically, the instant invention pertains to power-operated plows. Farming equipment is constantly being redesigned, modified and refined in order to provide the farmer with sophisticated equipment developed to obtain the maximum yield of farm products per acre in cultivation. Grain-producing areas are constantly striving to produce more bushels per acre per year and of higher quality each year, and such efforts are generally rewarded in the planting of grain in furrows uniformly spaced from one another and with the grain planted in furrows having uniform depth in order to obtain stands of uniform heights. To accomplish uniformity in depth of planting many alleged automatic control devices have heretofore been devised, but most have been found wanting when field-tested for many reasons among which rank as the foremost is the difficulty of installation of such control means in effecting a transfer of the control means from one model plow to another without radically rebuilding the basic plow, the frequent break-down of the depth-control means which occasions loss of time in effecting repairs, lost time due to the loss of use of the equipment, and the general inefficiency of prior-art depth-control devices to perform with the accuracy essential to the proper plow functions, and the relatively high expense in providing the depth-control device, per se, for any given agricultural instrument.

Additionally, and in plowing with modern tractor-drawn hydraulically-operated plows, even the most accomplished operator finds it most difficult to cut furrows of a constant depth for seeding purposes since the ground being worked is usually found to have irregular surface contours and is of varying density or compactness, characteristics of the earth which require that the operator maintain constant vigilance on the trailing plow-shares to maintain the same at the proper working depth. Additional difficulty is also encountered despite the best efforts of most qualified operators, since, frequently in carrying out plowing operations large dust clouds are raised of sufficient density and extent so as to preclude any observation by the operator of the trailing plowshares and hence, it is impossible for the operator to make the required corrections in order to obtain the maximum efficiency of use of the equipment. Still further, this is not only tedious work, but the results are seldom satisfactory since the control exercised by the operator, no matter how expert, is subject to human error even under the best of operating conditions.

The actual plowing, as a consequence, must be accomplished at a relatively slow rate which increases cost, results in low-operating efficiency, and frequently results in unrewarded effort.

Thus, the present invention has, as a primary object thereof, the provision of means for automatically-controlling the cutting depth of a plow in accordance with surface irregularities and variations of soil density of the ground or earth being worked.

Another object of this invention is to provide plow-depth control means which may be readily installed in existing plows or which may be built into plows as a part of the manufacturer's equipment.

A further object of this invention resides in the provision of automatically-controlled means for regulating the plow-cutting depth, the control means being simple in construction and foolproof, and wherein the construction is substantially shockproof in operation.

Still another object of this invention is to provide an automatic cutting-depth regulator for plows which is non-complex in construction and assembly, inexpensive to manufacture and maintain, and which is durable and rugged in use.

Other and further objects and advantages of the instant invention will become evident from a consideration of the following specification when read in conjunction with the annexed drawings, in which:

FIGURE 3 is an enlarged fragmentary detail cross-sectional view of a shank-type cultivator equipped with an automatic depth-cutting regulator according to this invention and showing the component elements thereof in their normal operating positions, FIGURE 3 being taken substantially on the vertical plane of line 3—3 of FIGURE 1, looking in the direction of the arrows;

FIGURE 4 is a fragmentary top plan view of the shank-type cultivator and automatic depth-cutting regulator as shown in FIGURE 3;

FIGURE 5 is a front elevational view of the cultivator and automatic depth-cutting regulator, FIGURE 5 being taken substantially on the vertical plane of line 5—5 of FIGURE 3, looking in the direction of the arrows;

FIGURE 6 is a longitudinal detail cross-sectional view, FIGURE 6 showing the relative association of the component parts of the cultivator and automatic depth-cutting regulator as the slope of the terrain of the ground being cultivated increases, FIGURE 6 being taken substantially on the vertical plane of line 6—6 of FIGURE 5, looking in the direction of the arrows;

FIGURE 7 is a fragmentary detail cross-sectional view, FIGURE 7 being taken substantially on the line 7—7 of FIGURE 3, looking in the direction of the arrows;

FIGURE 8 is an enlarged fragmentary detail cross-sectional view, FIGURE 8 being taken substantially on the vertical plane of line 8—8 of FIGURE 3, looking in the direction of the arrows;

FIGURE 9 is an enlarged fragmentary detail cross-sectional view, FIGURE 9 being taken substantially on the horizontal plane of line 9—9 of FIGURE 4, looking in the direction of the arrows; and FIGURE 10 is a schematic view illustrating the electrical and hydraulic circuits employed in the control of the automatic depth-control regulator.

Figures 1, 2:
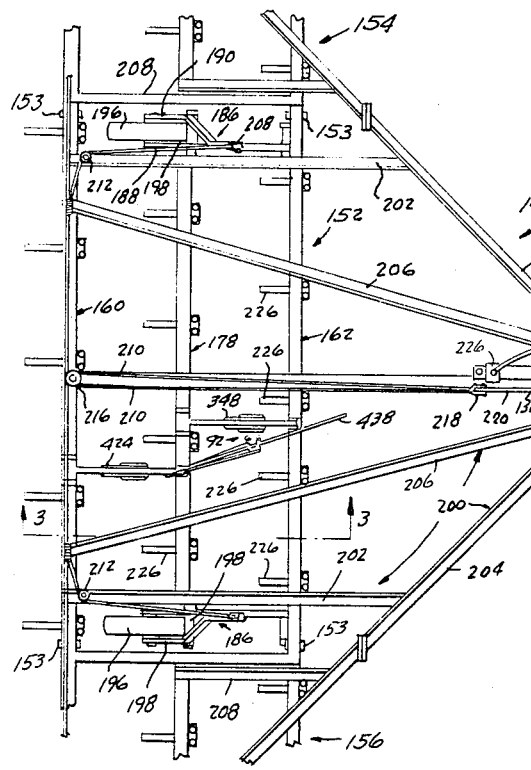
FIGURE 1 is a top plan view of a shank-type cultivator having an automatic cutting-depth regulator mounted thereon and constructed in accordance with this invention, FIGURE 1 illustrating the plow in its operative position and as being drawn by a conventional farm tractor.
FIGURE 2 is a side elevational view of the shank-type cultivator and automatic depth-cutting regulator shown in FIGURE 1, FIGURE 2 showing in dotted lines one position of the plow as a consequence of adjustment in response to the depth regulator.

Referring now more specifically to the drawings, reference numeral 20 designates, in general, a conventional farm tractor with specific reference to FIGURES 1 and 2 of the drawings, the farm tractor 20 being seen to include the usual body and chassis 22 which is wheel-supported, and in these two figures only the rear wheels 24 are illustrated. Suitably-positioned on the chassis, and preferably adjacent the rear end thereof, is a control valve 26 for a hydraulic circuit to be described, and an electrical control switch 28 for the control of the control valve 26. Neither the control valve 26 nor the control switch 28 taken, per se, is new to their respective arts, but as will become apparent, their use in conjunction with the regulator apparatus becomes new and important in the combination.

Conduits 30, 32 connect the control valve 26 with the hydraulic pump and hydraulic supply system of the conventional farm tractor 20, the conduit 30 being connected to the high pressure outlet side of the hydraulic pump (not shown), and the conduit 32 being connected with the return side of the hydraulic system, all in the conventional manner. FIGURE 10 of the drawings serves to better illustrate the workings of the control valve 26 and control switch 28 and, as shown in this figure, the control valve 26 is seen to include an elongated substantially cylindrical housing 34 having opposed end closure walls 36, 38. The housing 34, intermediate the ends thereof, is provided with a hydraulic fluid inlet port 40 which is, as shown in FIGURES 1 and 10, connected with the conduit 30. The end wall 38 is formed with a port 42 to which is connected the conduit 32. Disposed within the housing 34 is a spool valve 44 having longitudinally-spaced enlarged valve heads 46, 48 disposed therein, the valve heads 46, 48 being tied together by a connector rod 50. The valve heads 46, 48 and connector rod 50 are adapted to reciprocate within the housing 34 to control the flow of fluid through ports 52, 54 which extend transversely through the housing 34 and which are normally blocked by the valve heads 46, 48 when the valve 26 is in its neutral position, as shown in FIGURE 10. The connector rod 50, at that end thereof adjacent the closure wall 36, is provided with a fluid-exhaust port 56 which is in open communication with one end of a passage 58 which extends axially of the rod 50 and which opens at its other end 60 into the plane of the outer end of the valve head 48. The aforementioned end of the rod 50 has a portion 50' thereof which extends through the closure wall 36, the portion 50' being pivotally-connected at 62 to an elongated lever 64 intermediate the ends thereof. The lever 64, preferably, but not necessarily, is provided with an extension 65 at an end thereof to permit manual operation of the spool valve 44 should circumstances so dictate. The other end of the lever 64 connects through a pivot pin 66 with lugs 67 mounted on or formed integral with the end closure wall 36.

Reference numeral 68 denotes a normally horizontal platform which may be supported on the chassis or body 22 in any desirable location but, preferably, the same should be located proximate the housing 34. The platform 68 serves as a mount for the electrical control switch 28 which, as is seen in FIGURE 10, includes a pair of solenoids 70, 72 having armatures 74, 76 respectively, the solenoids 70, 72 being fixedly-secured to the platform 68 by any means conventional in the art. As seen in FIGURE 10, the armatures 74, 76 are disposed in confronting relationship relative to one another and are pivotally-connected on pivot pin 78 to one end of an elongated lever 80. Projecting laterally and downwardly from the platform 68 is a bracket 82 which, at 84, pivotally-supports and connects the lever 80 intermediate its respective ends, at a point adjacent to, but spaced inwardly from the aforementioned one end thereof.

The lower end of the lever 80 is bifurcated at 86 to provide a pair of arms 88, 90 which engage on opposite sides of the lever 64. From the foregoing description is is now obvious that as either of the solenoids 70, 72 is energized, the armatures 74, 76 thereof will be activated and will move axially to introduce movement in the lever 80 causing this lever to pivot about its pivotal connection 84 in one direction or the other, thereby imparting movement to the lever 64 that actuates the rod 50 to effect an axial shifting movement of the valve heads 46, 48 in accordance with the movement of the rod 50.

Reference numeral 92 designates, in general, a regulator switch of a single-pole, double-throw type. The switch arm 94 is pivotally-connected to one end of a shaft 96 in a manner to be more detailed below, and carries a switch contact 98 at one end of its respective ends. The switch contact 98 is adapted to be selectively-engaged with either of the fixed switch contacts 100 or 102 under circumstances to be described, or may remain in the non-contact-engaging position as shown in FIGURE 10.

Reference numeral 104 represents a battery or other source of E.M.F., carried on the tractor 20. The battery 104 is grounded as at 106 at one side thereof, and the other side of the battery 104 connects through wire 108 with the switch arm 94. The fixed switch contact 100 connects with one side of a winding for an electromagnetic relay switch 112, the other side of the winding of the relay switch 112 being connected to ground through wire 114. The electromagnetic relay switch 112 is normally open as shown in FIGURE 10, but when the winding for the electromagnetic relay switch 112 is energized by the engagement of the switch contact 98 with the fixed switch contact 100, the winding of the electromagnetic relay switch 112 becomes energized, causing the switch arm 116 to close against the fixed switch contact 118, thereby completing a second electric circuit to be described.

Still referring to FIGURE 10 of the drawings, one end of a wire 120 is connected with the wire 108 and the other end of the wire 120 connects with a wire 122 intermediate the ends thereof. One of the ends of the wire 122 is connected with the switch arm 116, while the other end thereof is connected with the switch arm 124 of a second electromagnetic relay switch 126. This last-mentioned switch also includes the fixed switch contact 128. Wire 130 connects the fixed switch contact 102 with one side of the winding for the electromagnetic relay switch 126, the other side of the winding for the switch 126 being connected to ground through the wire 132. From the foregoing description it is now clear that when the switch contact 98 engages the fixed switch contact 102 another electric circuit is energized through the solenoid or winding of the electromagnetic switch 126 which causes the switch arm 124 to close against the fixed switch contact 128 to establish still another electrical circuit.

When the electromagnetic relay switch 112 is energized causing the switch arm 116 to close against the fixed switch contact 118, an electric circuit is established to one side of the solenoid 70 through wires 108, 120, 122, switch arm 116, fixed switch contact 118 and wire 134. With the winding of the solenoid 70 so energized, the armatures 74, 76 are drawn to the left, reference being made to FIGURE 10, causing the lever 80 to pivot about its pivot pin 84 in a counterclockwise direction. When the lever so moves, the rod 50 is shifted to the left carrying with it the valve heads 46, 48, and in moving the valve heads 46, 48 the port 50 is uncovered while the port 54 remains blocked. Under these conditions, fluid under pressure will flow from the conduit 30 into the housing 34 for discharge through the port 50 into a conduit 136 which is connected to one end of a hydraulic cylinder 138 having a reciprocable piston (not shown) disposed therein. The hydraulic fluid exerts a pressure on the piston causing the piston rod 140 to be shifted to the right, as viewed in FIGURE 10, causing fluid disposed within the hydraulic cylinder 138 to be exhausted through the conduit 141 into the housing 34 to one side of the valve head 48 for discharge through the conduit 32 from whence the same is conducted back to the pump (not shown) in the usual manner.

Should the switch contact 98 be made to engage fixed switch contact 102, the electromagnetic relay switch 126 is energized causing the switch arm 124 to close against the fixed switch contact 128 causing the armatures 74, 76 to shift to the right, as viewed in FIGURE 10, and this motion as translated through the lever 80 causes the rod 50 to move to the right whereby the valve head 48 unblocks the port 54 permitting fluid to flow through the conduit 30, the housing 34, the port 54 and conduit 141 into the hydraulic cylinder 138 on the opposite side of the piston, and to exert a force thereon causing the piston rod 140 to move in the opposite direction (to the left) as seen in FIGURE 10. When the hydraulic cylinder 138 is so actuated, fluid is now expelled therefrom through the conduit 136, the ports 52, 56 and the passage 58 for discharge through the conduit 32 and consequently, back to the low-pressure side of the hydraulic system. The nature and functions of the regulator switch 92 and hydraulic cylinder 138 will be explained in more detail, infra.

Reference numeral 142 denotes the conventional tractor drawbar having an end thereof fixedly-secured to the tractor frame or chassis 22. The other end of the drawbar 142 is connected by means of a universal connector 144 to one end of an elongated cultivator tongue 146. The cultivator designated, in general, by reference numeral 148 is conventional in all respects and includes as a part thereof the elongated reinforcing strut 150 having one of its ends connected to the universal connector 144, and its other end fixedly-secured at 152 to the tongue 146 intermediate the ends thereof. The cultivator 148 comprises, essentially, an open substantially rectangular frame 152 (see FIGURE 1) to the opposed ends of which are pivotally-connected as at 153, a pair of end frames 154, 156, respectively, which form no important part of the instant invention aside from the fact that they, as well as the main frame 152, are normally horizontal and are controlled in their respective farming operations in the same manner as is the main frame in connection with the automatic adjustment of the depth of cut to be made by the cultivator 148 proper. At 158 is illustrated in phantom lines in FIGURE 2, one of two tripod structures utilized in the elevation of the end frame sections 154, 156.

The main frame 152 includes a pair of laterally-spaced longitudinally-extending parallel I-beam side frame members of which the rear or back side frame member 160 includes a normally vertical bight 164 and top and bottom flanges 166, 168, respectively. The front frame member 162 includes the bight 170 also vertically-extending, and the oppositely-disposed top and bottom flanges 172, 174, respectively. The opposed adjacent pairs of ends of the side frame members 160, 162 are fixedly secured to, respectively, a pair of elongated longitudinally-spaced and substantially parallel end frame members 176 (only one being shown in FIGURE 3), the side and end frame members being rigidly-connected together to form the aforesaid open substantially rectangular frame. As is seen in FIGURES 1, 3, 4, and 6, an elongated substantially centrally-located intermediate frame member designated at 178 extends parallel to the side frame members 160, 162 in laterally-spaced relation relative thereto, and this intermediate frame member 178 also comprises an I-beam having its opposed ends fixedly secured to the end frame members 176 by conventional means. This beam includes the normally upright bight portion 180 and the top and bottom normally horizontal flanges 182, 184, respectively.

Reference numeral 186 indicates one of a pair of identically-constructed wheel-supported yokes, each yoke including a substantially flat straight leg 188 and a flat straight leg 190 laterally-spaced from the leg 188 and extending parallel thereto. As is seen in FIGURE 5 of the drawings, the upper end of the leg 190 is connected by a bridge 192 to a the leg 188 intermediate the ends thereof. The adjacent lower ends of the legs 188, 190 carry a normally horizontal axle 194 on which is rotatably-supported a wheel 196. These wheels, as well as other wheels, not shown, and their yokes, are utilized in supporting the cultivator 148 as the same is drawn across farmlands. Each of the yokes 186 is pivotally-connected on a stub axle 198 (see FIGURE 1) which projects laterally and outwardly from the adjacent one of the end frame members 176. The wheels 196 comprise ground-engaging wheels and, due to their eccentric mounting, will raise and lower the cultivator 148 as the yokes 186 are pivoted about their respective stub axles 198.

The main frame 152 of the cultivator 148 is fixedly-secured to a sub-frame assembly 200 which includes the tongue 146 which extends transversely across the side frame members 160, 162 and the intermediate frame member 178 centrally of the ends thereof and is connected thereto by conventional means, not shown. The tongue 146 overlies the side and intermediate frame members and is shown in this position only in FIGURE 1, and the other members of the sub-frame assembly 200 include the angle members 202 disposed on each side of the tongue 146 and which are secured to the flanges 166, 172 and 182 by conventional means (not shown), these members being disposed substantially perpendicular to the side and intermediate frame members 160, 162 and 178, respectively. The angle members 202 adjacent the forward ends thereof are rigidly-connected to angle members 204 which have one of their respective ends connected to the back or rear side frame member 160, the other ends thereof converging forwardly for rigid connection with the tongue 146. Other struts such as, for example, the angle members 206, 208 are also rigidly-connected to the flanges 166, 172 and 182 of the side and intermediate frame members 160, 162 and 178, and each of these frame members has their respective forward ends connected to the converging angle members 204. It will be understood that the sub-frame assembly 200 is shown as being connected on the main frame 152 in FIGURES 1 and 2, and for the purpose of clarity of illustration, these elements have been excluded from the remaining figures in order to avoid a confusion in the reading of the drawings. It should be noted, at this point, however, that the end frame members 176 are disposed below the angle members 202 and are, therefore, concealed from view in FIGURE 1.

Referring now more particularly to FIGURES 1, 2 and 5, it is seen that each of the yokes 186 at the point of their bifurcation continue into throats 208 to the outer ends of which are fixedly-secured one of the ends of a pair of cables 210. The other ends of the cables 210 are trained about a pair of pulleys 212 mounted on the angle members 202 adjacent their rear ends and are supported therefrom on straps 214 (see FIGURE 5). The cables 210 at each side of the cultivator 148 converge inwardly and are trained about a conventional pulley system 216 adjacent that end of the tongue 146 which is connected to the back or rear side frame member 160 (see FIGURE 1). Each of the cables 210 is then led forwardly and has the respective other end fixedly-connected at 218 to one end of an elongated substantially rectangular slide bar 220 mounted for reciprocation through a guide 222 fixedly-secured to the tongue 146. As is clearly seen in FIGURES 1 and 2, the slide bar 220 terminates at its other end in an offset link 224 and as is seen in FIGURE 1, the link 224 is fixedly-secured to the outer end of the piston rod 140 of the hydraulic cylinder 138 which, in turn, is fixedly-connected to the tongue 146 as by brackets 226.

The above-described construction is conventional in the art of cultivating equipment and the description thereof has been deliberately curtailed preserving only to this invention such background as to lead to an intelligent understanding thereof. Thus, it is seen that with the wheels 196 disposed in their ground-engaging position shown in FIGURES 2, 3, 5 and 6, and with the piston rod 140 of the hydraulic cylinder 138 disposed in the retracted position as shown in FIGURES 1 and 2, movement of the spool valve 44 in such a direction (reference being made to FIGURE 10) as to open the port 52 will permit fluid under pressure to activate the hydraulic cylinder 138 in such a manner as to extend the piston rod 140. As the piston rod 140 effects this movement the cables 210 are drawn forwardly of the cultivator 148 and in so moving, exert a force on the upper ends of the throats 208 of the yokes 186 causing the wheels 196 to pivot about their respective stub axles 198 in a counter-clockwise direction, reference being had to FIGURE 2 of the drawings, thereby elevating the cultivator 148. This will cause the cultivator shanks 226 which had been previously set to plow at a predetermined depth to move upwardly, thereby lessening the degree of shank penetration within the ground 228. When the control valve 26 is operated in such a manner as to open the port 54 for communication with the hydraulic cylinder 138, the piston rod 140 is retracted, that is, moved to the left as viewed in FIGURE 10, and this movement is transmitted back to the yokes 186 causing the cultivator frame 148 to move downwardly, thereby increasing the depth of penetration of the shanks 226. It is the control of the hydraulic cylinder 138 that forms the subject matter of this invention.

The control means for the hydraulic cylinder 138 comprises, for the most part, a superstructure to which has been assigned the reference numeral 300. The superstructure may best be described through first reference to FIGURES 3, 4, 5, 6 and 9, wherein, reference numerals 302 designate a pair of L-shaped brackets having horizontal feet 304 and upstanding legs 306. The brackets 302 are supported on the intermediate frame member 178 in longitudinally-spaced relationship relative to the frame member 178 and, as seen in FIGURE 7, the angle members 302 open toward one another. Each of the brackets 302 is provided with suitable openings extending transversely through their respective foot portions to receive therethrough the clamping bolts 308 which extend on opposite sides of the flanges 182, 184 and through a suitably-apertured clamping plate 301 to receive securing nuts 312 thereon which, upon being tightened, fixedly-clamp the brackets 302 to the intermediate frame member 178. Each of the brackets 302 has welded or otherwise fixedly-secured thereon a substantially hollow cylindrical sleeve 314, the sleeves 314 being coaxially-aligned with one another and having adjacent confronting ends. The sleeves 314 rotatably-journal an elongated substantially hollow cylindrical shaft 316, to which further reference will be made below.

Fixedly-secured to the hollow cylindrical shaft 316, intermediate its ends, is a normally upright substantially rectangular first lever 318 having a transversely-extending opening 319 formed therein adjacent the outer end thereof (see FIGURE 9). As is seen in the several figures of the drawings, the first lever 318 is positioned adjacent the rear or back side of the shaft 316, and fixedly-secured to the latter and projecting forwardly and upwardly therefrom is one end of an elongated substantially hollow tubular first rock arm 320. The outer end of the rock arm 320 is provided with a plurality of axially-spaced, diametrically-opposed transversely-extending adjustment openings 322 to serve a function to be described.

Reference numeral 324 denotes one of a pair of T-shaped links each of which includes a stem 326 having a plurality of adjustment openings 328 extending transversely therethrough in longitudinally-spaced relation. The T-shaped links 324 each includes a crosshead 330 which is integrally-formed with the upper end of each of the stems 326, and one of the ends of each of the crossheads 330 is formed with a plurality of transversely-extending longitudinally-spaced adjustment openings 332. The T-shaped links 324 are juxtaposed relative to each other in congruent relationship and are superposed against the outer end of the first rock arm 320 on diametrically-opposed sides thereof, and the openings 322 of the rock arm 320 and the openings 332 of the T-shaped links 324 are aligned with one another to receive therethrough a plurality of lock bolts 334 (see FIGURES 3 and 9).

Reference numeral 336 (see FIGURE 9) indicates a Y-shaped yoke having a normally upwardly-extending substantially cylindrical stem 338 integrally-connected at its lower end to the central portion of a normally horizontally-extending substantially rectangular bridge 340. The remotely-disposed ends of the bridge 340 are integrally-connected with a pair of oppositely-disposed spaced and substantially parallel depending arms 342, 344 which project away from the bridge 340 at a rearwardly-inclined angle. The lower ends of the arms 342, 344 support an axle 346 which rotatably-supports a ground-engaging surface-feeler wheel 348. The cylindrical stem 338 is encompassed by an elongated substantially hollow cylindrical spacer sleeve 350 having an end thereof normally engaging against the bridge 340 and its other or upper end terminating at a point below the upper end of the cylindrical stem 338. At 352 is indicated a substantially hollow cylindrical collar and which seats at its lower end against the upper end of the hollow cylindrical spacer sleeve 350. The collar 352 is releasably-secured in this position as by means of the set screw 354. The spacer sleeve 350 is provided with diametrically-opposed radially-extending cylindrical lugs 356 that are fixedly-secured thereto and which are releasably-received in and extend transversely through a selected one of the pairs of aligned openings 328 formed in the stems 326 of the T-shaped links 324. Thus, and to serve a purpose to become more clear below, the stem 338 is free to rotate in any direction about its upright axis within the sleeve 350.

Adjustments of the apparatus are made at this point only when it is wished to make a radical change in the depth one has been cultivating such as, for example, to change from a two-inch deep furrow to an eight-inch deep furrow, or vice versa. To accomplish this adjustment, the bolts 334 must first be removed after which the T-shaped links 326 are spread apart and the spacer sleeve 350 together with its lugs 356 are moved into the proper one of the adjustment holes or openings 328. The elements are then re-assembled in the manner described.

The upper end of the stem 338 is reduced in diameter to form an upright integrally-connected standard 358 which terminates at its outer end in a threaded extension 360. The threaded extension 360 receives thereover the looped end 362 of an elongated helicoidal spring 364 having its other end looped at 366 through the eye 368 of a screw 370. The screw 370 is provided with a threaded shank 372 that extends rearwardly through the opening 319 formed in the first lever 318. A lock nut 373 is threaded over the extension 360 to releasably-secure the looped end 362 on the standard 358, and a spring-tension adjustment nut 376 is threaded on the shank 372 on that side of the lever remotely-disposed with respect to the eye 368. Reference numeral 378 indicates an inverted substantially U-shaped bracket having an elongated substantially rectangular bight portion 380 from the opposed ends of which downwardly-depend a pair of spaced, parallel and substantially rectangular side arms 382, 384. At 386 is indicated a conventional shock-absorbing mechanism, which includes the usual substantially cylindrical elongated casing 388 in which is telescoped for reciprocation the conventional plunger 390. The upper end of the casing 388 terminates in an integrally-connected substantially hollow cylindrical boss 392 which is supported between the side arms 382, 384 by means of a transversely-extending pin 394. Diametrically-opposed bolts 396 fixedly and rigidly-connect the lower ends of the arms 382, 384, respectively, to the outer ends of the T-shaped links 324. The lower end of the plunger 390 is integrally-connected with the hollow cylindrical boss 398, and the boss 398 is received between the arms 400, 402 of a substantially U-shaped bracket 404 having a bight 406. A pivot pin 408 pivotally-connects the boss 398 between the arms 400, 402. As is clearly seen in FIGURES 5 and 6, the bight 406 terminates at opposed sides in downwardly-extending, inwardly-reverted ends 410 which engage about the opposed sides of the flange 166 to adjustably-clamp the bracket 404 to the beam 162. As is clearly seen in FIGURE 5 of the drawings, the opposite or forward ends of the T-shaped links 324 are pivotally-connected on the pins 396 between the arms 382, 384 and at diametrically-opposed sides of the casing 388.

Referring now more specifically to FIGURES 3, 5 and 6, reference numeral 412 denotes a vertically-elongated substantially rectangular block fixedly-secured by conventional means to the upper end of the arm 382. The block 412 is provided with a suitable passageway 414 which extends throughout its axial length. The passageway 414 receives therethrough one end of an elongated substantially cylindrical rod 416 (see FIGURES 5 and 6), the rod 416 being held in adjusted position within the block 412 by means of set screws 418. The upper end of rod 416 is enlarged and flattened into a substantially rectangular head 420 through which transversely-extends a vertically-elongated substantially rectangular slot 422.

With the exception of the block 412, the rod 416 and the rectangular head 420, the entire control assembly described supra is repeated rearwardly of the main frame 152, and elements of the repetitive structure finding their counterparts in the structure described above are differentiated therefrom through the use of identical reference numerals to which has been added a prime mark. Through reference to FIGURE 1 of the drawings, it is seen that the construction detailed above is disposed substantially centrally of the cultivator 148 while, on the other hand, the structure carrying the primed reference characters is spaced longitudinally therefrom with reference to the main frame 152. In the structure carrying the primed reference numerals, the back frame member 160 becomes substituted for the intermediate frame member 178 and the intermediate frame member 178 serves the same function as the front frame member 162. Thus, the rock arm 320' is seen to be pivotally-supported from the back frame member 162 and the shock-absorbing mechanism 369' is pivotally-supported on the intermediate frame member 178. The only true departure between the two mechanisms resides in the substitution of a shank follower disc wheel 424 for the previously employed ground-engaging wheel 348. In all other respects the two constructions are identical. Through reference to FIGURES 3 and 5 of the drawings, it is seen that the ground-engaging wheel 348 is disposed rearwardly of and intermediate a pair of shanks 226 carried on the front frame member 162 while the disc 424 rearwardly tracks one of the same or another of the shanks 226 carried on the front frame member 162, the disc 424 having been adjusted to track the bottom 426 of the furrow 428 being plowed by the shank 226.

Referring now more particularly to FIGURES 3, 6 and 7, reference numeral 430 denotes an elongated substantially rectangular strap formed of rigid material and having one of its ends fixedly-secured to the outer side of the side arm 384'. The forward or leading end of the strap 430 is provided with a plurality of transversely-extending openings 432 which receive transversely therethrough a pin 434 on which is pivotally-connected (see FIGURE 5) the bifurcated arms 436, 436 which project laterally from an elongated substantially rectangular bar 438 in a laterally-offset relation relative thereto (see also FIGURE 4). The other end of the bar 438 projects upwardly and is extended through the slot 422 formed in the flat rectangular head 420, the bar 438 normally resting on the lower end of the slot. As is seen in FIGURES 3 and 5, an elongated vertically-extending link 440 provided with vertically-elongated slot 442 is loosely-mounted over the upper and outer end of the bar 438, and the lower end of the link 440 is integrally-connected with a depending lug 444 to which is fixedly-connected one end of a spring 446, the other end of the spring 446 being anchored in an eye 448 fixedly-secured to the rod 416 intermediate the ends thereof. From the foregoing construction it is clearly seen that the bar 438 is constantly biased for movement toward the lower end of the slot 422.

Fixedly-secured to the side arm 384' adjacent the upper end thereof and projecting above the bight 380' is a vertically-elongated substantially rectangular riser 450 which receives in its upper end the outer end of a pivot pin 452, the other end of the pivot pin 452 being fixedly-secured to a normally horizontal sleeve 454. The sleeve 454 loosely-receives for reciprocation therethrough an elongated substantially cylindrical control rod 456. Fixedly-secured to the upper side of the sleeve 454 and projecting forwardly therefrom is an elongated substantially hollow tubular normally horizontal support member 458 from which depends an elongated hollow tubular guide sleeve 460 which, as is seen in the drawings, slidably-receives for reciprocation therethrough a portion of the rod 456.

Slidably-mounted on the control rod 456 adjacent the rear end thereof is an anchor block 462 held in adjusted position by means of a set screw 464. One end of a helicoidal spring 466 is connected to the anchor block 462, and the other end thereof is fixedly-connected, by conventional means, to the hollow tubular support member 458. With reference to FIGURE 3 of the drawings, from the construction given above it is seen that the control rod 456 is constantly biased for movement to the right as viewed in FIGURE 3. A hanger bracket 468 depends from the control rod 456 intermediate the ends thereof. Reference numeral 472 designates an elongated substantially cylindrical rod (see FIGURES 3 and 8) having an offset end 470 which is pivotally-received within the hanger bracket 468.

With specific reference to FIGURE 8 of the drawings, reference numeral 474 denotes a substantially U-shaped bracket having a bight 475 from the opposed ends of which upwardly-project a pair of spaced and substantially parallel side arms 476, 478. The side arm 476 carries an extension 480 which projects beyond the other side of the bight 475. As is seen in FIGURE 8, the other end of the rod 472 carries a lateral projection 482 which is pivotally-connected to the outer end of the extension 480.

Reference numeral 484 indicates an elongated pivot pin to which is pivotally-mounted the outer end of the side arm 478, the pin extending through the upper and outer end of the bar 438 and carries spacer collars 486.

The single-pole, double-throw switch 92 is of the wiper type and is conventional in the art. As such, the fixed switch contacts 100, 102 are fixedly-secured within the housing 490 of the switch 92, the housing including an externally-threaded neck 492 on which is mounted the outer end of the side arm 476. Lock nuts 494 are threaded on the neck 492 and clamp the outer end of the side arm 476 tightly to the neck 492 whereby as the bracket 474 pivots about the pivot pin 484, the housing turns therewith. Extending through the neck 492 and into the housing 490 is one end of the shaft 96 to which is fixedly-connected the wiping switch arm 94 carrying the contact 98. As is seen in FIGURE 8, the outer end of the shaft 96 connects through one end of a link 496, the other end of the link 496 being pivotally-connected on the offset extension 498 of the rod 456.

Having described and illustrated in detail the component elements of this invention, the operation of the control mechanism is deemed to be self-evident. However, and for the purposes of clarity of expression, a brief description of the operation of the control device is set forth below.

With the shank-type cultivator 148 connected to the farm tractor 20 in the usual manner through the universal joint 144 the wheels 196 normally engage the surface of the ground 228. The main frame 152 is adjusted to be substantially horizontal and is adjusted relative to the wheels 196 until the shanks 226 are plowing a furrow 428 of the desired depth. The shank follower disc 424 is then adjusted to this depth and the ground-engaging feeler wheel 348 is adjusted to make surface contact with the ground 228. The tractor is then activated to draw the cultivator 148 in the usual manner across the field to be cultivated.

Just prior to the operation of the cultivator, the proper adjustments are made through the rod 456 so that at the desired cutting depth of the shanks 226 the switch arm 94 is maintained substantially equidistant between the two fixed switch contacts 100, 102. Thus, and through the operation of the tractor 20, and assuming that the feeler wheel 348 begins to trace terrain 228A elevated above the normally horizontal ground surface 228, the feeler wheel 348 moves upwardly and carries with it the rock arm 320 and the T-shaped links 324. This pivotal movement of the rock arm 320 causes the casing 388 to rise relative to its plunger 390 and in so moving, causes the bar 438 to pivot upwardly in a counterclockwise direction, reference being made to FIGURE 3 of the drawings. As the bar 438 pivots upwardly the link 496 and extension 480 tend to pivot in a clockwise direction causing the switch contact 98 to engage the fixed switch contact 100, thereby energizing the circuit through the electromagnetic relay switch 112 causing the switch arm 116 to close against the fixed switch contact 118 establishing, thereby, a circuit to the solenoid 70. The solenoid 70 being so energized causes the armatures 74, 76 to shift to the right as viewed in FIGURE 10, and this movement is transmitted to the rod 50 causing the port 52 to be unblocked whereby fluid under pressure is admitted to the cylinder 138 causing the expulsion of the piston rod 140. The piston rod 140 causes the link 224 to move toward the tractor 20 thereby drawing the cables 210 inwardly toward the tractor 20, whereby the yokes 186 are pivoted in a counterclockwise direction, reference being made to FIGURE 2 of the drawings, thereby maintaining the depth of the penetration of the shanks 226 constant as the slope of the ground surface 228A increases. Should the grade of the ground surface 228A be downwardly-inclined, the fixed switch contact 98 is engaged through the operation of the rod 456 with the fixed switch contact 102 which energizes the relay switch 126 and the solenoid 72 causing the armatures 74, 76 to move to the right as viewed in FIGURE 10, whereby the rod 50 is shifted to the left moving the spool valve 44 in such a manner as to expose the port 54 to high pressure fluid through the conduit 30. This, of course, drives the hydraulic cylinder 138 in the opposite direction causing the retraction of piston rod 140 and the consequent movement of the link 224 inwardly toward the hydraulic cylinder 138, thereby relaxing the cables 210 and allowing the yokes 186 to pivot in the reverse direction.

The follower disc 424 in tracing the lower end 426 of the furrow 428 plowed by the shank 226′ operates the control mechanism in substantially the same way, it being recognized that the original adjustment of the disc follower wheel 424 relative to the ground-engaging wheel 348 was originally set to maintain a furrow 428 of constant depth, and any change in the relationship of the position of the wheel 424 relative to the wheel 348 will cause an instant adjustment in the cultivator 148. Thus, and if for some reason the depth of the furrow 428 should become, for example, smaller than the desired depth, the follower wheel 424 will move upwardly carrying with it the bracket assembly 378′ which, in this instance, effects the same initial response described above in the control equipment.

It will be understood that the above-described control assembly is effective to maintain a constant furrow depth regardless of whether the wheels 196 ride upon a hard ground surface or are permitted to sink somewhat into the ground since the furrow 428 to be plowed would be plowed to a constant depth as measured between the point of tangency of the ground-engaging wheel 348 with the ground surface 228A and the tangency of the disc wheel 424 with the bottom 426 of the furrow 428.

Having described and illustrated one embodiment of this invention in detail, it will be understood that the same is offered merely by way of example, and that this invention is to be limited only by the scope of the appended claims.

What is claimed is:

1. In combination with a mobile farm implement having a normally horizontal frame supporting ground-engaging tools, said frame having a plurality of supporting wheels and including means to vertically adjust said wheels relative to said frame to thereby control the depth of penetration of said tools into the ground, and automatically-operated control means constantly monitoring said vertical adjustment means to maintain a constant depth of ground penetration of said ground-engaging tools as said farm implement is drawn across said ground, said automatic means including tracking means suspended on a substantially vertical swivel axis from said frame and swingable about a horizontal pivot to track the bottom of the furrow cut by said ground-engaging tools, sensing means suspended on a substantially vertical swivel axis from said frame and swingable about a horizontal pivot for sensing the surface of the ground, and means connected with said tracking means and said sensing means operable in response to a change in the vertical distance between said tracking and sensing means to effect operation of said vertical adjustment means for said wheels whereby said frame is maintained at a constant vertical adjustment from said ground surface.

2. The combination recited in claim 1, wherein said farm implement comprises a cultivator frame, said means to vertically adjust the wheels including a fluid pressure device connected to said supporting wheels to adjust their position relative to the cultivator frame, said automatic control means including an electrical and fluid pressure circuit, said tracking means including a disc pivotally-supported on said frame and tracking one of said ground-engaging tools, said sensing means comprising a ground surface-engaging wheel and means pivotally-supporting said ground-sensing wheel on said frame, said electric circuit including means for connecting to a source of E.M.F., a normally open switch connected in said circuit and holding said circuit normally de-energized, a pair of solenoids connected in said circuit, said solenoids each having a movable armature, said switch being supported by linkage means between said tracking disc and said ground-sensing wheel and operable to turn in response to a vertical change in the position of either said tracking wheel or said ground-sensing wheel relative to each other to effect the closing of said switch in one direction or another and thereby establish an energizing circuit to the appropriate one of said solenoids, said fluid pressure circuit including a control valve for admitting pressure fluid to said fluid pressure device for adjusting the supporting wheel, and means mechanically-connecting said control valve with both of said armatures whereby selective energization of either of said solenoids causes movement of their respective armature to effect substantially simultaneous operation of said control valve and consequently of said fluid pressure device thereby effecting substantially simultaneous vertical adjustment of said support wheel.

3. The combination recited in claim 2, wherein said farm implement includes a shank-type cultivator frame including a tongue for connection to a farm tractor having a hydraulic system and an electrical system, said ground-engaging tools comprising a plurality of ground-engaging cultivator shanks, said tongue having said fluid pressure device in the form of a hydraulic cylinder mounted thereon, said cylinder having a reciprocable piston rod, yokes pivotally-connected on said cultivator frame, said plurality supporting wheels being rotatably mounted in said yokes, flexible means connecting said yokes with said piston rod whereby reciprocation of said piston rod effects a vertical adjustment of said supporting wheels relative to said cultivator frame, a rock arm having an end pivotally-connected on said cultivator frame, said disc of the tracking means being rotatably-supported on the other end of said rock arm, a second rock arm having an end pivotally-connected on said cultivator frame, said ground sensing wheel being supported for rotation on the other end of said second rock arm, said linkage means extending between and connected with said other ends of said first and second rock arms and supporting said normally open electrical switch, switch-actuating means extending between said other end of said first rock arm and said switch, said switching-actuating means being responsive to any change in the position of said switch-supporting linkage means to effect the closing of said switch, said electrical circuit of said implement being connected in said tractor electrical circuit, said solenoids including confronting reciprocable armatures, means connecting together said armatures for said reciprocable movement, said control valve being a spool valve connected in said hydraulic circuit and operable to admit hydraulic fluid under pressure to said hydraulic cylinder to effect movement of said piston rod in one direction or the other to thereby effect adjustment of said implement supporting wheels, and lever means connecting said spool valve with said armatures operable in response to movement thereof to effect actuation of said spool valve.

4. The combination defined in claim 1, wherein said cultivator frame includes front and back parallel elongated side frame members and a pair of end frame members extending between and connecting adjacent pairs of ends of said side frame members, an intermediate frame member disposed between and connected to said end frame members, said intermediate frame member being laterally-spaced from and parallel to said side frame members, said one ends of said rock arms being pivotally-supported on said back and intermediate frame members, shock-absorbing means connecting the other ends of said first and second rock arms with said intermediate and front frame members, respectively, and said switch supporting and actuating means including a bar having an end thereof pivotally-connected on one of said shock-absorbing means and means on the other end of said shock-absorbing means slidably and rotatably-connecting the other end of said bar thereon, said switch comprising a single-pole double-throw switch having a pivotal switch arm and including a contact movable between two fixed switch contacts, and rod means slidably-connected at one of their respective ends with said one shock-absorber means, the other ends of said rod means being pivotally-connected with said switch arm.

5. The combination recited in claim 4, and means pivotally-connecting said shock-absorbing means with their respective rock arm, and resilient means extending between said shock-absorbing means and said back and intermediate side frame members constantly biasing said follower and sensing wheels for pivotal movement in the direction of said front frame member.

6. The combination recited in claim 5, wherein said switch includes a casing having said fixed switch contacts mounted thereon, a shaft having an end thereof extending through and rotatably-journaled in said housing between said fixed switch contacts and having said switch arm fixedly-secured thereon, lever means fixedly-connected intermediate its ends to the other end of said shaft, said rod means including first and second rods, means on said first shock-absorber means loosely and slidably-receiving one end of said first rod therein, means pivotally-connecting the other end of said first rod to one end of said last-named lever, means pivotally-connecting one end of said second rod on said first rod intermediate the ends thereof, means pivotally-connecting the other end of said second rod with the other end of said last-named lever, and means connected to said first rod and to said means on said first shock-absorbing means constantly biasing said first rod for movement toward said first shock-absorbing means.

References Cited

UNITED STATES PATENTS

| | | | |
|---|---|---|---|
| 2,627,979 | 2/1953 | Acton | 172—4 |
| 2,720,716 | 10/1955 | White | 172—4 |
| 3,362,483 | 1/1968 | Twidale | 172—311 |

ABRAHAM G. STONE, *Primary Examiner.*

JIMMIE R. OAKS, *Assistant Examiner.*

U.S. Cl. X.R.

172—414, 456